United States Patent
Galab

(10) Patent No.: US 9,982,770 B2
(45) Date of Patent: May 29, 2018

(54) MANUAL TRANSMISSION OIL FEEDER

(71) Applicant: GM Global Technology Operations LLC, Detroit, MI (US)

(72) Inventor: Mohammad Galab, Vuyyuru (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 418 days.

(21) Appl. No.: 14/952,219

(22) Filed: Nov. 25, 2015

(65) Prior Publication Data
US 2017/0146110 A1    May 25, 2017

(51) Int. Cl.
*F16H 3/08* (2006.01)
*F16H 57/04* (2010.01)
*F16H 3/089* (2006.01)

(52) U.S. Cl.
CPC ....... *F16H 57/043* (2013.01); *F16H 57/0426* (2013.01); *F16H 57/0494* (2013.01); *F16H 3/089* (2013.01)

(58) Field of Classification Search
USPC .................................................. 74/325, 467
See application file for complete search history.

(56) References Cited

U.S. PATENT DOCUMENTS

| | | | | |
|---|---|---|---|---|
| 8,388,486 | B2* | 3/2013 | Ekonen | B60K 17/344 |
| | | | | 475/220 |
| 9,528,593 | B2* | 12/2016 | Tage | F16H 57/0423 |
| 9,625,028 | B2* | 4/2017 | McKinzie | F16D 1/06 |
| 9,713,955 | B2* | 7/2017 | Kanada | B60K 6/365 |
| 9,850,993 | B2* | 12/2017 | Bazyn | F16H 15/52 |

* cited by examiner

*Primary Examiner* — Ha Dinh Ho

(57) ABSTRACT

A transmission oil feeder for a motor vehicle includes an input member defining a rotating shaft. An output member defines a rotating shaft. A gearing arrangement connects the input member to the output member. An oil feeder tube is disposed within a central bore of at least one of the input member or the output member. The oil feeder tube is in communication with a supply of lubricating oil. Multiple apertures are created through a wall of the oil feeder tube at a bottom of the oil feeder tube enhancing gravity flow of the lubricating oil out of the apertures. The apertures are individually prepositioned proximate to one of multiple gear sets of the gearing arrangement. Each of the apertures of the oil feeder tube deliver a portion of the supply of lubricating oil to the one of the multiple gear sets.

20 Claims, 4 Drawing Sheets

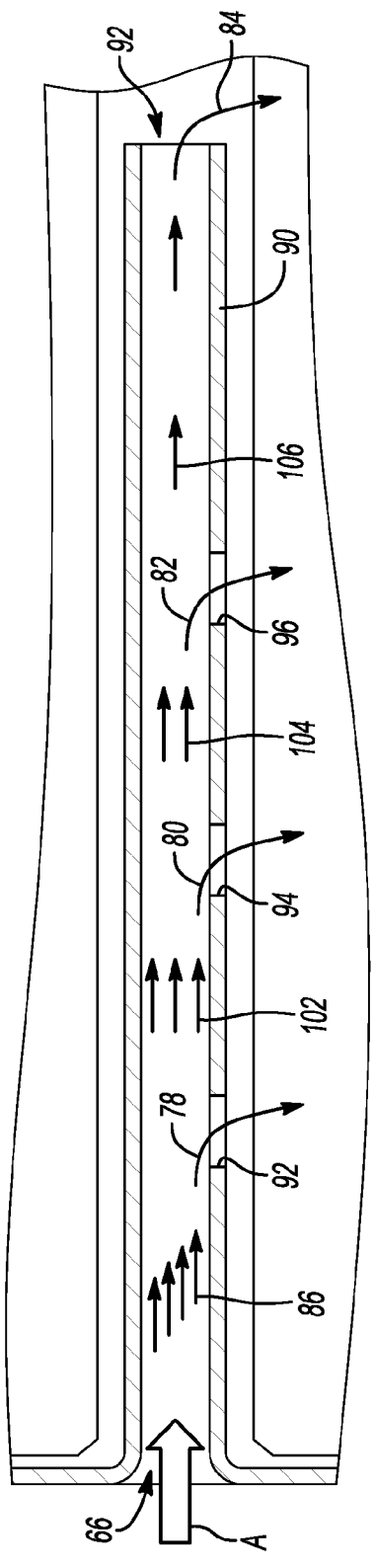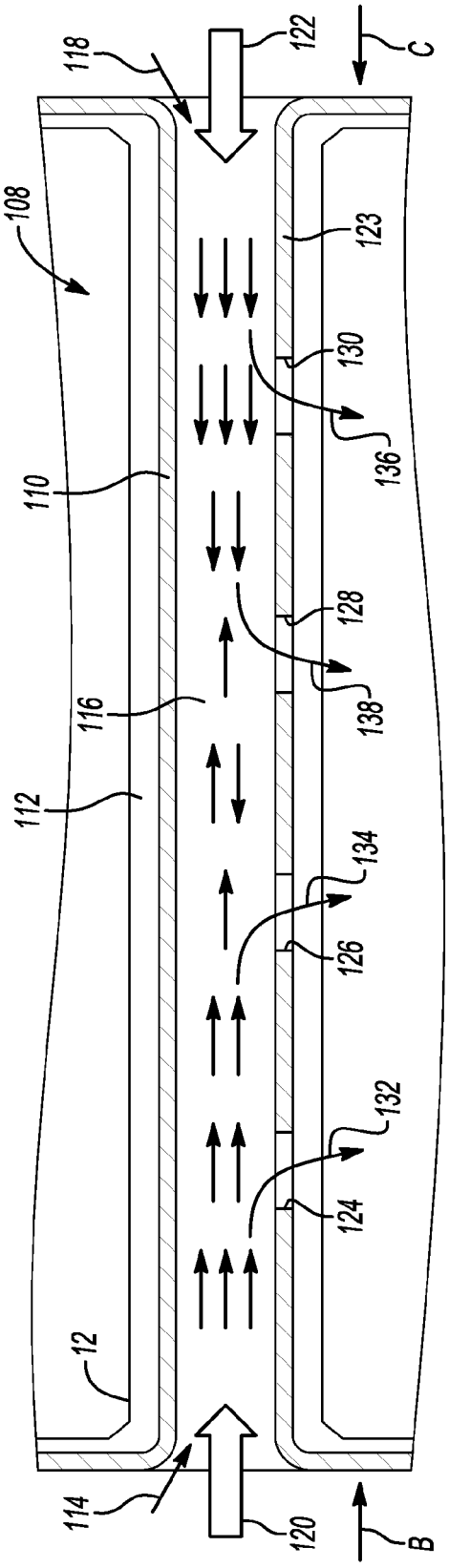

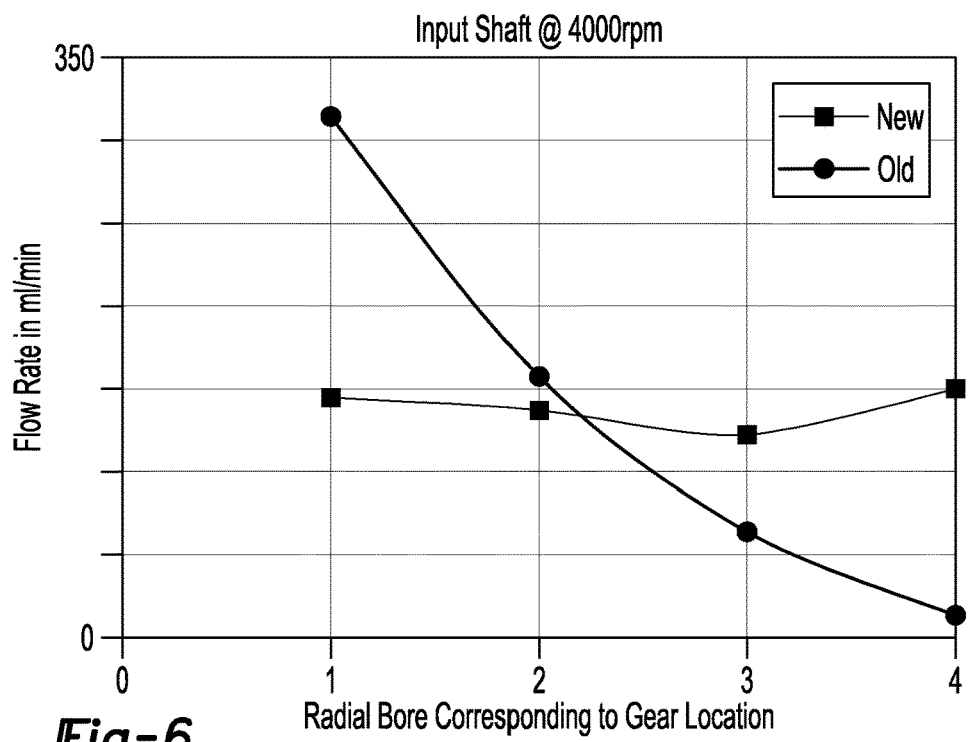
_Fig-6_
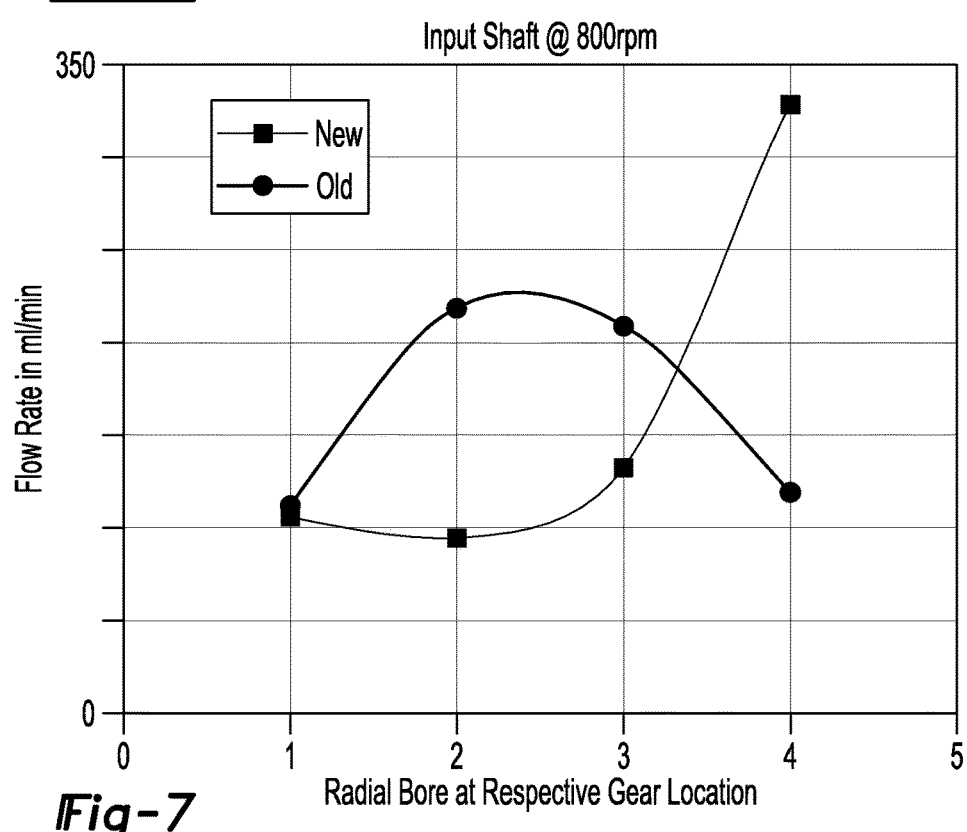
_Fig-7_

MANUAL TRANSMISSION OIL FEEDER

TECHNICAL FIELD

The present disclosure relates to transmissions and more particularly to a manual transmission having positively delivered lubricating oil to each of its gear sets.

BACKGROUND

The statements in this section merely provide background information related to the present disclosure and may or may not constitute prior art.

A typical multiple speed manual transmission having input and output shafts and multiple gear sets commonly includes longitudinal oil delivery bores in the shafts for delivery of lubricating oil received at one end of the bore to individual side bores opening into the longitudinal bore which direct the oil to the various gear sets. In manual transmissions oil splashed by a ring gear is commonly guided to the input shaft, main shaft needle bearings, and the gear synchronizers by an oil feeder which extends only partially into the oil delivery bore. At higher vehicle speeds such as above 80 Km per hour, i.e., when the input shaft is rotating at or above approximately 2500 rpm, a centrifugal force is created by the rotating input shaft that imparts back pressure to incoming fluid (transmission oil) entering the longitudinal bore. The centrifugal force can inhibit or prevent oil from reaching the side bores located proximate to an end of the shaft. This often results in limited, very negligible, or in some circumstances and rotational speeds no oil being delivered to the gear sets positioned proximate the last or end side bores of the shafts.

In known manual transmissions oil feeders are arranged generally in two different locations. In a first type, the oil feeder is located at a clutch side such that incoming oil to the transmission is dispersed primarily to lower speed gears such as gear 1 and gear 2. At higher shaft rotational speeds the synchronizers for the higher speed gears receive less oil, which is undesirable. In other known transmissions the oil feeder is located at a transmission side. In these transmissions incoming transmission oil is dispersed primarily to higher speed gears such as gear 5 and gear 6. At higher shaft rotational speeds the synchronizers for the lower speed gears will receive less oil, which is also undesirable.

While current transmissions achieve their intended purpose, the need for new and improved transmission configurations which exhibit improved performance, especially from the standpoint of delivery of lubricating oil to all gear sets at all operating speeds of the transmission.

SUMMARY

The present invention provides a transmission oil feeder for a motor vehicle, including an input member and an output member. A gearing arrangement connects the input member to the output member. An oil feeder tube is disposed within a central bore of at least one of the input member or the output member. The oil feeder tube is in communication with a supply of lubricating oil and further includes multiple apertures created through a wall of the oil feeder tube individually prepositioned proximate to one of multiple gear sets of the gearing arrangement. Each of the apertures of the oil feeder tube deliver a portion of the supply of lubricating oil to the one of the multiple gear sets.

According to further aspects of the transmission oil feeder for a motor vehicle the input member and the output member each define a shaft having multiple gear sets positioned thereon.

According to further aspects of the transmission oil feeder for a motor vehicle a synchronizer assembly connects paired ones of the gear sets of the first member and the second member, successive ones of the apertures of the oil feeder tube further delivering a portion of the supply of lubricating oil to the one of the synchronizer assemblies.

According to further aspects of the transmission oil feeder for a motor vehicle a portion of an initial flow of the lubricating oil entering the oil feeder tube is distributed out through a first one of the apertures, resulting in a flow of approximately 75% of the initial flow continuing toward a second one of the apertures.

According to further aspects of the transmission oil feeder for a motor vehicle a second portion of the initial flow of the lubricating oil entering the oil feeder tube is distributed out through the second aperture, resulting in a flow of approximately 50% of the initial flow continuing toward a third one of apertures.

According to further aspects of the transmission oil feeder for a motor vehicle a third portion of the initial flow of the lubricating oil entering the oil feeder tube is distributed out through the third aperture, resulting in a flow of approximately 25% of the initial flow continuing toward and exiting from an open end of the oil feeder tube.

According to further aspects of the transmission oil feeder for a motor vehicle an open end of the oil feeder tube prepositioned in the central bore proximate to one of the multiple gear sets, the open end delivering a portion of the supply of lubricating oil to the one of the multiple gear sets.

According to further aspects of the transmission oil feeder for a motor vehicle each of the apertures is created at a low point of the wall of the oil feeder tube.

According to further aspects of the transmission oil feeder for a motor vehicle the apertures define first, second, and third apertures each equally sized.

According to further aspects of the transmission oil feeder for a motor vehicle each of the apertures have an opening dimension of approximately 3.5 mm.

According to further aspects of the transmission oil feeder for a motor vehicle the oil feeder tube is coaxially aligned with a longitudinal axis of the central bore, the cylindrical wall separated from a periphery wall defined by the central bore for an entire length of the oil feeder tube except at a connection of the oil delivery tube to an oil feeder tube inlet connection.

According to further aspects of the transmission oil feeder for a motor vehicle the gearing arrangement includes gear sets rotatably supported by each of the input member and the output member.

According to further aspects of the transmission oil feeder for a motor vehicle the gearing arrangement includes a plurality of synchronizer assemblies for selectively meshing individual gears of the gear sets of the input member with individual gears of the gear sets of the output member, the synchronizer assembles individually supplied with the lubricating oil by at least one of the apertures.

The above features and advantages and other features and advantages of the present invention are readily apparent from the following detailed description of the best modes for carrying out the invention when taken in connection with the accompanying drawings.

DRAWINGS

FIG. 4 is a cross sectional front elevational view of the oil feeder of FIG. 1;

FIG. 5 is a cross sectional front elevational view of an alternate aspect of an oil feeder in accordance with the present disclosure;

FIG. 6 is a graph comparing oil flow rates at transmission gear locations with and without the present oil feeder at an input shaft speed of 4000 rpm; and FIG. 7 is a graph comparing oil flow rates at transmission gear locations with and without the present oil feeder at an input shaft speed of 800 rpm.

DESCRIPTION

Figure 1:
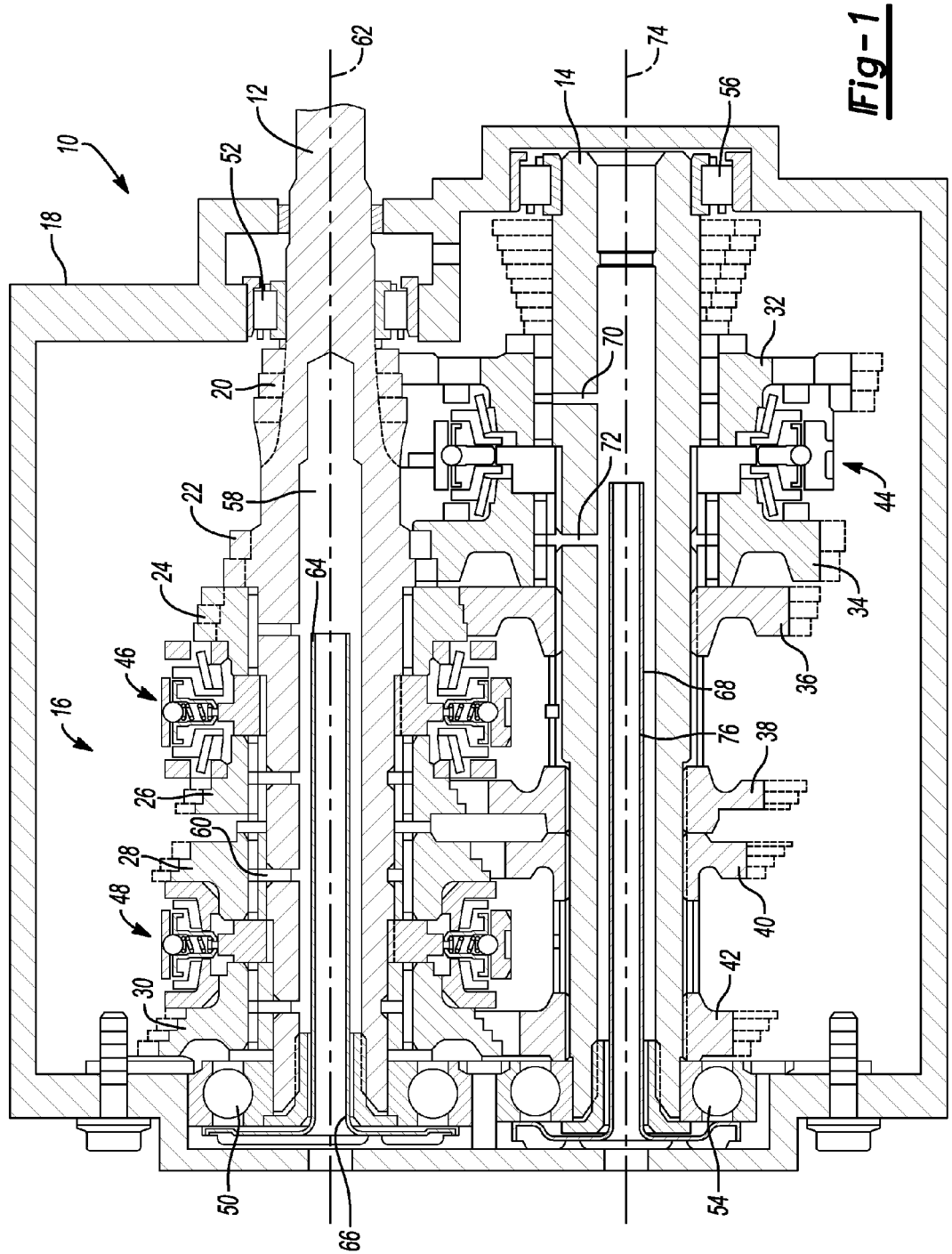
FIG. 1 is a cross sectional front elevational view of a manual transmission with multiple oil feeders in accordance with the present disclosure.

Referring to FIG. 1, a multiple speed manual transmission generally indicated by reference number 10 is illustrated and will now be described. The transmission 10 includes an input member or shaft 12, an output member or shaft 14 arranged parallel to the input member 12, and a gearing arrangement 16 together with the input member 12 and the output member 14 at least partially enclosed by a transmission housing 18. The input member 12 is selectively connectable to an engine output member (not shown) through a manually activated clutch. The input member 12 may be further isolated from the engine output member through a flywheel or damper (not shown) to improve vibration transmission from the engine to the transmission 10. The output member 14 transfers torque via a differential assembly (not shown) to drive wheels.

The gearing arrangement 16 includes various shafts or members, intermeshing gear sets, and selectively engageable synchronizers, as will be described herein. For example, the gearing arrangement 16 includes first, second, third, fourth, fifth, and sixth gear sets 20, 22, 24, 26, 28, 30 which may be stepped gears. Each of the first, second, third, fourth, fifth, and sixth gear sets 20, 22, 24, 26, 28, 30 are fixed to the input member 12 for common rotation with the input member 12. The gearing arrangement 16 also includes first, second, third, fourth, fifth, and sixth gear sets 32, 34, 36, 38, 40, 42 which may be stepped gears. Each of the first, second, third, fourth, fifth, and sixth gear sets 32, 34, 36, 38, 40, 42 are fixed to the output member 14 for common rotation with the output member 14. Furthermore, the gears of the first, second, third, fourth, fifth, and sixth gear sets 20, 22, 24, 26, 28, 30 intermesh with corresponding gears of each of the first, second, third, fourth, fifth, and sixth gear sets 32, 34, 36, 38, 40, 42.

The gearing arrangement 16 further includes a plurality of synchronizer assemblies for selectively connecting individual gears of the first, second, third, fourth, fifth, or sixth gear sets 20, 22, 24, 26, 28, 30 with corresponding gears of the first, second, third, fourth, fifth, or sixth gear sets 32, 34, 36, 38, 40, 42 for common rotation. For example, a first synchronizer assembly 44 is disposed on the output member 14 and selectively connects one of the gears of the first gear set 20 with one of the gears of the first gear set 32, or one of the gears of the second gear set 22 with one of the gears of the second gear set 34. A second synchronizer assembly 46 is disposed on the input member 12 and selectively connects one of the gears of the third gear set 24 with one of the gears of the third gear set 36, or one of the gears of the fourth gear set 26 with one of the gears of the fourth gear set 38. A third synchronizer assembly 48 is disposed on the input member 12 and selectively connects one of the gears of the fifth gear set 28 with one of the gears of the fifth gear set 40, or one of the gears of the sixth gear set 30 with one of the gears of the sixth gear set 42.

The transmission 10 is capable of transmitting torque from the input shaft member 12 to the output member 14 in multiple forward torque ratios and at least one reverse torque ratio. Each of the forward torque ratios and the reverse torque ratio is attained by selective engagement of one or more of the synchronizer assemblies 44, 46, 48. Those skilled in the art will readily understand that a different speed ratio is associated with each torque ratio. It should be appreciated that any one of the gear sets 20, 22, 24, 26, 28, or 30, or the gear sets 32, 34, 36, 38, 40, or 42 may be changed to produce a certain forward and reverse torque ratio without departing from the scope of the present invention.

The input member 12 and output member 14 are rotatably supported in the housing 18 through a plurality of bearings. For example, the input member 12 is rotatably supported by the housing 18 through a first bearing 50 and a second bearing 52. The output member 14 is rotatably supported by the housing 18 through a third bearing 54 and fourth bearing 56.

According to a first oil feeder system 57, transmission fluid or oil is available at a first end of the input member 12 and is dispersed to lubricate each of the third, fourth, fifth, or sixth gear sets 24, 26, 28, 30 through a central bore 58 extending at least partially through the input member 12. Oil is delivered to the gear sets from the central bore 58 through a plurality of distribution passages 60 which are oriented generally perpendicular to a longitudinal axis 62 of the input member 12. The central bore 58 is coaxially aligned with the longitudinal axis 62. To enhance lubrication of the first, second, third, fourth, fifth, and sixth gear sets 20, 22, 24, 26, 28, 30 and the associated synchronizer assemblies at all rotational speeds of the input member 12, an oil feeder tube 64 is disposed within the central bore 58 and extends from an inlet connection 66 positioned proximate to the first bearing 50 to a position proximate to the third gear set 24. The inlet connection 66 is sealed proximate to the first bearing 50 to only permit fluid flow upstream of the inlet connection to enter through the inlet connection 66 and thereby into the oil feeder tube 64.

Transmission fluid or oil is also dispersed to lubricate each of the first and second gear sets 32, 34 through a central bore 68 extending substantially entirely through the output member 14. Oil is delivered from the central bore 68 through a plurality of distribution passages 70, 72 which are oriented generally perpendicular to a longitudinal axis 74 of the output member 14. The central bore 68 and the oil feeder tube 64 are coaxially aligned with the longitudinal axis 74. To enhance lubrication of the first and second gear sets 32, 34 and the associated synchronizer assembly 44 at all rotational speeds of the output member 14, a similarly configured second oil feeder tube 76 can also be provided in the central bore 68 of the output member 14.

Referring to FIG. 2 and again to FIG. 1, the oil feeder tube 64 receives all of the lubrication oil supply for the first, second, third, fourth, fifth, and sixth gear sets 20, 22, 24, 26, 28, 30. To ensure lubrication oil reaches all of the gear sets and each of the synchronizer assemblies, the oil supply is delivered in a flow direction "A" in portions of the total oil flow to each of the third, fourth, fifth, and sixth gear sets 24, 26, 28, 30. A first portion 78 of oil is distributed proximate to the sixth gear set 30. A second portion 80 of oil is distributed proximate to the fifth gear set 28. A third portion 82 of oil is distributed proximate to the fourth gear set 26. A fourth portion 84 of oil is distributed proximate to the third gear set 24. The first portion 78 and the second portion 80 also lubricate the third synchronizer assembly 48. The third portion 82 and the fourth portion 84 also lubricate the second synchronizer assembly 46.

Figure 2:
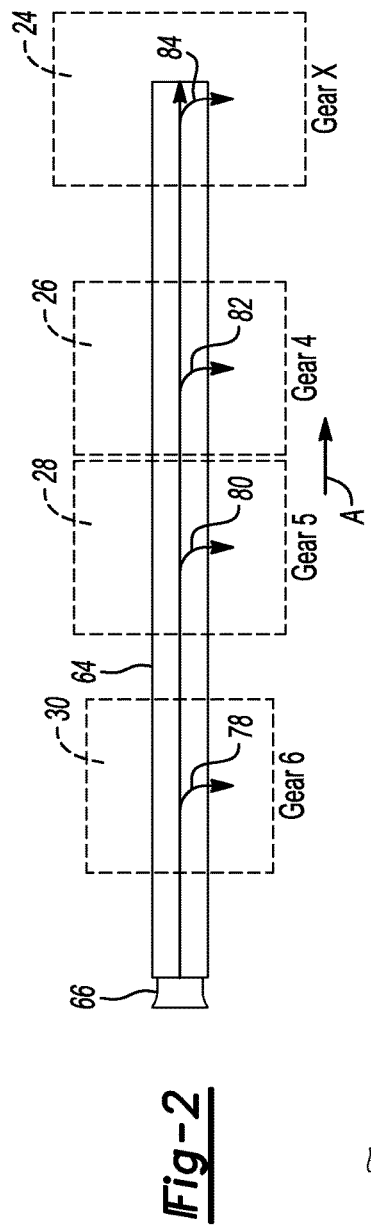
FIG. 2 is a diagrammatic view of one of the oil feeders of FIG. 1.
Figure 3:
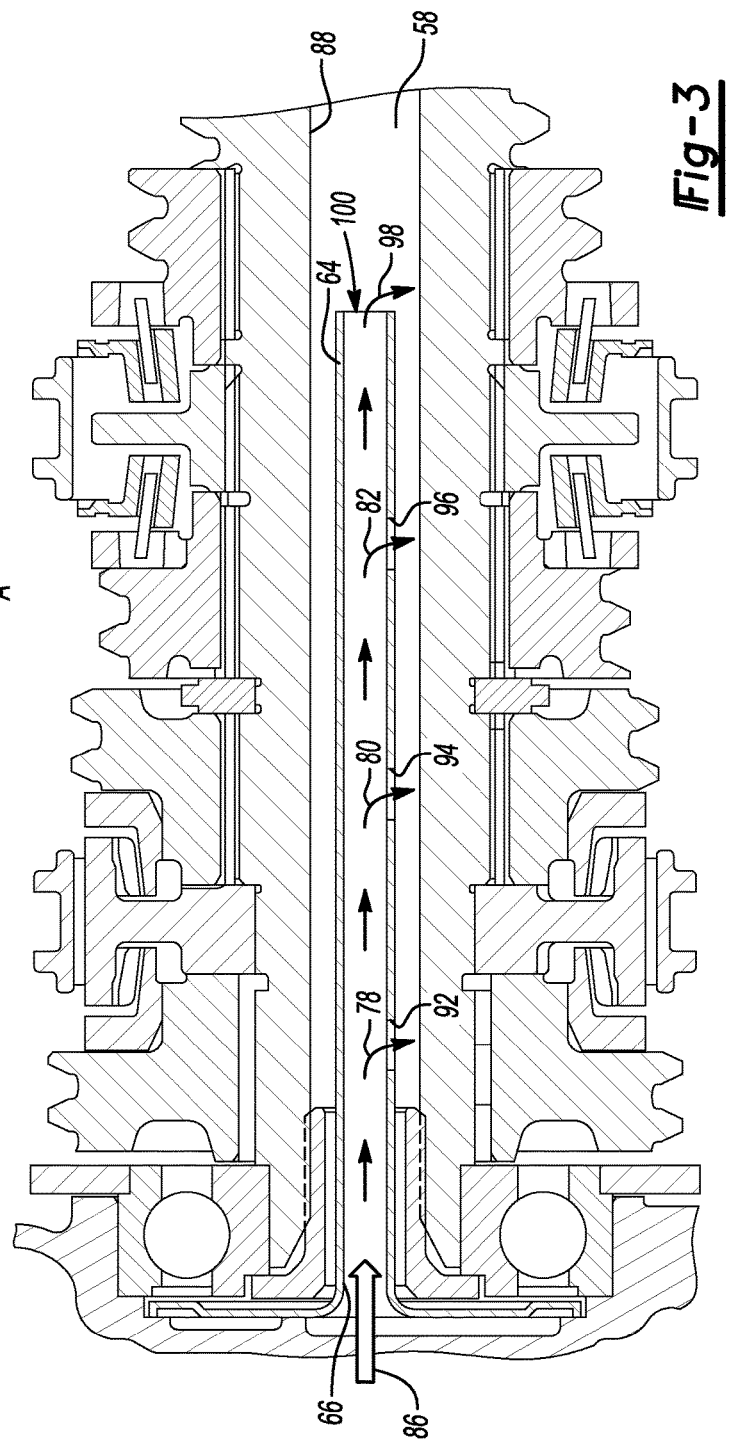
FIG. 3 is a cross sectional front elevational view of area 3 of FIG. 1.

Referring to FIG. 3 and again to FIGS. 1 through 2, a total flow 86 of incoming lubrication oil enters the oil feeder tube 64 through the inlet connection 66 and is initially separated from a periphery wall 88 of the central bore 58 by a cylindrical wall 90 of the oil feeder tube 64. The cylindrical wall 90 is separated from periphery wall 88 for an entire length of the oil feeder tube 64 except at the connection of the oil delivery tube 64 to the inlet connection 66. The first portion 78 of oil is distributed via a first aperture 92 extending through the wall 90 which is prepositioned proximate to the sixth gear set 30. The second portion 80 of oil is distributed via a second aperture 94 extending through the wall 90 which is prepositioned proximate to the fifth gear set 28. The third portion 82 of oil is distributed via a third aperture 96 extending through the wall 90 which is prepositioned proximate to the fourth gear set 26. A fourth portion 84 defining a remainder of oil is distributed via an open end 100 of the oil feeder tube 64 which is prepositioned proximate to the third gear set 24.

Referring to FIG. 4, the total flow 86 of lubricating oil enters the inlet connection 66 in the flow direction "A". According to several aspects, each of the first, second, and third apertures 92, 94, 96 are positioned at a low point or bottom position of the wall 90 to maximize outward flow due to both pressure and gravity. According to several aspects, the first, second, and third apertures 92, 94, 96 are each equally sized, and in several aspects have an opening dimension of approximately 3.5 mm. The opening dimension can vary as desired to achieve an equal flow delivery through each of the first, second, and third apertures 92, 94, 96 and the open end 100 of approximately 25% of the total flow 86. After the first portion 78 of oil is distributed out through the first aperture 92, a flow 102 of approximately 75% of the initial total flow 86 continues toward the second aperture 94. After the second portion 80 of oil is distributed out through the second aperture 94, a flow 104 of approximately 50% of the initial total flow 86 continues toward the third aperture 96. After the third portion 82 of oil is distributed out through the third aperture 96, a flow 106 of approximately 25% of the initial total flow 86 continues toward and exits the open end 92 of the oil feeder tube 64. According to other aspects, the opening dimension of the first, second, and third apertures 92, 94, 96 can vary from one another, and can also vary from the 3.5 mm dimension discussed above. According to still other aspects, the percentage of the initial total flow 86 distributed by each of the first, second, and third apertures 92, 94, 96 and the open end can also vary from each other.

Referring to FIG. 5 and again to FIGS. 1 through 4, according to further aspects, in a second oil feeder system 108 transmission fluid or oil is available at opposite first and second ends of the input member 12 and is dispersed to lubricate each of the third, fourth, fifth, or sixth gear sets 24, 26, 28, 30 through an oil feeder tube 110 extending entirely through a central bore 112 of the input member 12. The oil feeder tube 110 is disposed within the central bore 112 and extends from a first inlet connection 114 positioned proximate to the first bearing 50 through a continuous inner passage 116 which is also in fluid communication with an oppositely positioned second inlet connection 118.

A first oil supply 120 is delivered in a flow direction "B" into the inner passage 116 through the first inlet connection 114. A second oil supply 122 is delivered in a flow direction "C" opposite to the flow direction "B" through the second inlet connection 118. A wall 123 of the oil feeder tube 110 provides four apertures including a first aperture 124, a second aperture 126 a third aperture 128, and a fourth aperture 130 each positioned at a lowermost bottom position of the wall 123. According to several aspects, a first portion 132 of the first oil supply 120 is distributed via the first aperture 124 which is prepositioned proximate to the sixth gear set 30. A second portion 134 of the first oil supply 120 is distributed via the second aperture 126 which is prepositioned proximate to the fifth gear set 28. A first portion 136 of the second oil supply 122 is distributed via the fourth aperture 130 which is prepositioned proximate to the third gear set 24. A second portion 138 of the second oil supply 122 is distributed via the third aperture 128 which is prepositioned proximate to the fourth gear set 26.

It should be evident that different ones of the first aperture 124, the second aperture 126, the third aperture 128, and the fourth aperture 130 can receive flow from either or both of the first oil supply 120 or the second oil supply 122. Therefore, one of the first oil supply 120 or the second oil supply 122 can dominate the majority of oil flow to any or all of the first aperture 124, the second aperture 126, the third aperture 128, or the fourth aperture 130 depending on available oil volume and pressure.

Referring to FIG. 6 and again to the aspects defined by FIGS. 1 through 4, test results of oil delivery using the oil feeder tube 64 of the present disclosure compared to an existing input member having no internal flow tube at input member rotational speeds of 4000 rpm is presented. It is evident that oil delivery to each of the third, fourth, fifth, and sixth gear sets 24, 26, 28, 30 drops continuously for the existing system lacking the oil feeder tube 64 of the present disclosure. When the oil feeder tube 64 of the present disclosure is present the oil flow rate to each of third, fourth, fifth, and sixth gear sets is substantially equal.

Referring to FIG. 7 and again to the aspects defined by FIGS. 1 through 4, test results of oil delivery using the oil feeder tube 64 of the present disclosure compared to an existing input member having no internal flow tube at input member rotational speeds of 800 rpm is presented. It is evident that oil delivery to each of the third and sixth gear sets 24, 30 is substantially less that oil delivery to the fourth and fifth gear sets 26, 28 for the existing system lacking the oil feeder tube 64 of the present disclosure. When the oil feeder tube 64 of the present disclosure is present the oil flow rate to each of the third, fourth, and fifth gear sets 24, 26, 28 is substantially equal, and oil flow rate to the sixth gear set 30 from the oil feeder tube 64 is substantially increased.

While the best modes for carrying out the invention have been described in detail, those familiar with the art to which this invention relates will recognize various alternative designs and examples for practicing the invention within the scope of the appended claims.

What is claimed is:

1. A transmission oil feeder for a motor vehicle, comprising:
   an input member;
   an output member;

a gearing arrangement connecting the input member to the output member; and an oil feeder tube disposed within a central bore of at least one of the input member or the output member, the oil feeder tube in communication with a supply of lubricating oil and further including multiple apertures created through a wall of the oil feeder tube individually prepositioned proximate to one of multiple gear sets of the gearing arrangement, each of the apertures of the oil feeder tube delivering a portion of the supply of lubricating oil to the one of the multiple gear sets.

2. The transmission oil feeder for a motor vehicle of claim 1, wherein the input member and the output member each define a shaft having multiple gear sets positioned thereon.

3. The transmission oil feeder for a motor vehicle of claim 2, further including a synchronizer assembly connecting paired ones of the gear sets of the first member and the second member, successive ones of the apertures of the oil feeder tube further delivering a portion of the supply of lubricating oil to the one of the synchronizer assemblies.

4. The transmission oil feeder for a motor vehicle of claim 1, wherein a portion of an initial flow of the lubricating oil entering the oil feeder tube is distributed out through a first one of the apertures, resulting in a flow of approximately 75% of the initial flow continuing toward a second one of the apertures.

5. The transmission oil feeder for a motor vehicle of claim 4, wherein a second portion of the initial flow of the lubricating oil entering the oil feeder tube is distributed out through the second aperture, resulting in a flow of approximately 50% of the initial flow continuing toward a third one of apertures.

6. The transmission oil feeder for a motor vehicle of claim 5, wherein a third portion of the initial flow of the lubricating oil entering the oil feeder tube is distributed out through the third aperture, resulting in a flow of approximately 25% of the initial flow continuing toward and exiting from an open end of the oil feeder tube.

7. The transmission oil feeder for a motor vehicle of claim 1, further including an open end of the oil feeder tube prepositioned in the central bore proximate to one of the multiple gear sets, the open end delivering a portion of the supply of lubricating oil to the one of the multiple gear sets.

8. The transmission oil feeder for a motor vehicle of claim 1, wherein each of the apertures is created at a low point of the wall of the oil feeder tube.

9. The transmission oil feeder for a motor vehicle of claim 1, wherein the apertures define first, second, and third apertures each equally sized.

10. The transmission oil feeder for a motor vehicle of claim 1, wherein each of the apertures have an opening dimension of approximately 3.5 mm.

11. The transmission oil feeder for a motor vehicle of claim 1, wherein the oil feeder tube is coaxially aligned with a longitudinal axis of the central bore, the cylindrical wall separated from a periphery wall defined by the central bore for an entire length of the oil feeder tube except at a connection of the oil delivery tube to an oil feeder tube inlet connection.

12. The transmission oil feeder for a motor vehicle of claim 1, wherein the gearing arrangement includes gear sets rotatably supported by each of the input member and the output member.

13. The transmission oil feeder for a motor vehicle of claim 1, wherein the gearing arrangement includes a plurality of synchronizer assemblies for selectively meshing individual gears of the gear sets of the input member with individual gears of the gear sets of the output member, the synchronizer assembles individually supplied with the lubricating oil by at least one of the apertures.

14. A transmission oil feeder for a motor vehicle, comprising:

an input member defining a rotating shaft having multiple gear sets connected to the input member;

an output member defining a rotating shaft having multiple gear sets connected to the output member;

multiple synchronizer assemblies individually connecting paired ones of the gear sets of the input member and the output member;

an oil feeder tube disposed within a central bore of at least one of the input member or the output member, the oil feeder tube at a in communication with a first supply of lubricating oil, the oil feeder tube having multiple apertures created through a tubular wall of the oil feeder tube at a bottom of the oil feeder tube wall to permit gravity flow of the lubricating oil out of the apertures, the apertures individually prepositioned proximate to one of multiple gear sets of each of the input member and the output member, each of the apertures of the oil feeder tube delivering a portion of the lubricating oil to the one of the multiple gear sets of each of the input member and the output member and to the one of the synchronizer assemblies.

15. The transmission oil feeder for a motor vehicle of claim 14, further including an open end of the oil feeder tube prepositioned in the central bore proximate to a different one of the multiple gear sets, the open end delivering a portion of the supply of lubricating oil to the different one of the multiple gear sets.

16. The transmission oil feeder for a motor vehicle of claim 14, wherein the apertures are equally sized.

17. The transmission oil feeder for a motor vehicle of claim 14, wherein each of the apertures have an opening dimension of approximately 3.5 mm.

18. The transmission oil feeder for a motor vehicle of claim 14, wherein the oil feeder tube is coaxially aligned with a longitudinal axis of the central bore, the cylindrical wall separated from a periphery wall defined by the central bore for an entire length of the oil feeder tube except at a connection of the oil delivery tube to an oil feeder tube inlet connection.

19. The transmission oil feeder for a motor vehicle of claim 14, further including a second oil supply providing lubricating oil to a second inlet connection of the oil feeder tube, at least one of the apertures of the oil feeder tube delivering a portion of the second supply of lubricating oil to a different one of the multiple gear sets of each of the input member and the output member and to a different one of the synchronizer assemblies.

20. A motor vehicle transmission, comprising:

a transmission housing;

an input shaft having multiple gear sets connected to the input shaft, the input shaft rotatably supported to the transmission housing by at least one bearing assembly;

an output shaft having multiple gear sets connected to the output member, the output shaft rotatably supported to the transmission housing by at least one bearing assembly;

multiple synchronizer assemblies selectively engaging individual ones of the gear sets of the input shaft and the output shaft;

an oil feeder tube disposed within a central bore of at least one of the input shaft or the output shaft, the oil feeder tube in communication with a supply of lubricating oil; and multiple apertures created through a wall of the oil feeder tube at a bottom of the oil feeder tube enhancing gravity flow of the lubricating oil out of the apertures, the apertures individually prepositioned proximate to one of multiple gear sets of both the input shaft and the output shaft, each of the apertures of the oil feeder tube delivering a portion of the lubricating oil to the one of the multiple gear sets of each of the input shaft and the output shaft and to one of the synchronizer assemblies.

* * * * *